No. 703,015. Patented June 24, 1902.
J. H. SWINDELL.
NUT LOCK.
(Application filed Mar. 14, 1900.)
(No Model.)

Witnesses
J.H. Swindell, Inventor.
By his Attorneys,

UNITED STATES PATENT OFFICE.

JAMES HENRY SWINDELL, OF PENSACOLA, FLORIDA.

NUT-LOCK.

SPECIFICATION forming part of Letters Patent No. 703,015, dated June 24, 1902.

Application filed March 14, 1900. Serial No. 8,632. (No model.)

*To all whom it may concern:*

Be it known that I, JAMES HENRY SWINDELL, a citizen of the United States, residing at Pensacola, in the county of Escambia and State of Florida, have invented a new and useful Nut-Lock, of which the following is a specification.

This invention relates to nut-locks, and has for its object to provide an improved device of this character in which all separate and movable parts are dispensed with, so as to preclude the possibility of loss or derangement of the locking means, and thereby to maintain the device in proper condition for immediate application to lock the nut. It is furthermore designed to provide means for facilitating the offsetting of a portion of the thread of the bolt laterally, so as to form an interlocked connection between the nut and the bolt to prevent accidental loosening of the former and at the same time permitting of the nut being removed by the application of force, and finally to provide means for plainly indicating the point where the bolt-thread is offset to prevent the offset portion of the bolt-thread from breaking when being displaced.

My invention consists in the peculiar construction and combination of devices hereinafter fully described and claimed.

Figure 1:
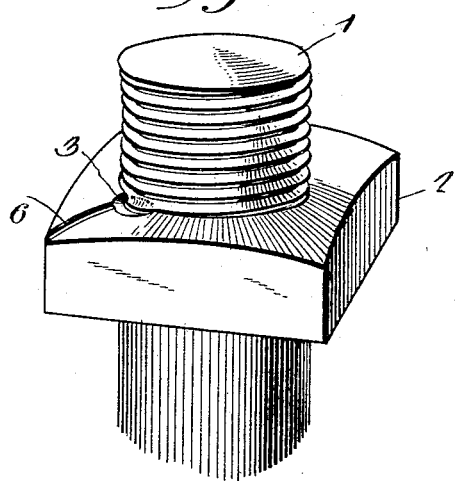
Figure 2:
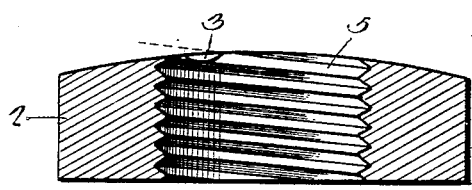
Figure 3:
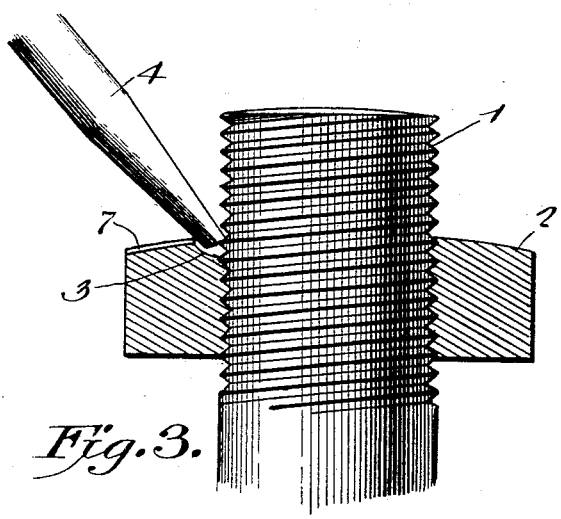

In the drawings, Figure 1 is a perspective view of a bolt and a nut equipped with the present invention. Fig. 2 is a sectional view of the nut and showing the notch or recess into which the threads of the bolt are to be upset. Fig. 3 is a sectional view of Fig. 1 and illustrates the manner of upsetting the threads of the bolt to form the interlocked connection between the latter and the nut.

Corresponding parts in the several figures of the drawings are designated by like characters of reference.

Referring to the accompanying drawings, 1 designates any common or ordinary screw-threaded bolt, having a nut 2 fitted to the screw-threaded portion thereof in the usual manner. It will be understood that these parts may have any common or preferred form, as the novelty of the present invention resides in a slight change in the nut only and is not dependent upon the shape thereof.

In carrying out the invention a notch or recess 3 is formed in the outer face of the nut and at the edge of the threaded bore thereof. This notch or recess is comparatively shallow and in the form of a surface depression, so as not to weaken the nut, and is located in advance of the point where one of the grooves of the screw-threads of the bore of the nut comes out at the outer face of the latter, as plainly shown in Fig. 2 of the drawings.

In the operation of the device the nut is set to the desired position upon the bolt and then any suitable instrument, as a punch 4, is placed against the thread of the bolt, which engages the groove 5, and overhangs the notch or surface depression 3, as indicated by the dotted line in Fig. 2 of the drawings, and one or more blows are struck upon the punch, so as to bend or upset a portion of the thread of the bolt and spread or mash the same into the surface depression or recess and against the walls thereof, whereby an interlocked connection is formed between the nut and the bolt to prevent accidental loosening of the former. The back or base of the depression is but slightly within the plane of the outer face of the nut, so that the thread of the bolt is designed to be forced or upset directly into contact with said base or back, whereby the latter forms a support for the upset portion of the thread and prevents the same from being broken out under the action of the implement employed to upset the thread. It will of course be understood that the nut may be loosened by the application of force; but it is effectively held against accidental displacement by jarring or movement of the object to which the bolt and nut may be applied. Although but one recess has been shown, it will be understood that a plurality may be employed, as may be found necessary or convenient; but ordinarily one recess is sufficient.

As shown in Fig. 1, there is a rib 6 extending radially outward from the notch or recess 3 and is designed to form means for indicating the location of the notch or recess. Instead of a rib a groove 7 may be employed. It is preferable to have these indicating means extend to the extreme edge of the nut, so that they may be readily seen or felt by the hand to plainly indicate the position of the notch or recess, which is comparatively small, and therefore not readily discernible.

While it is preferable, it is not essential that a depression be formed for the reception of the upset portion of the threads of the bolt, as said upset portion may merely engage the outer face of the nut, which will have the desired result of preventing unscrewing of the latter. However, it is essential that the threads be upset at a certain point with relation to the threads of the nut in order that there may be no looseness to the nut. As hereinbefore set forth, this point is at or just in advance of where one of the grooves of the bolt-opening comes out through the face of the nut, and in order that the threads of the bolt may be upset at the proper place I have provided the face of the nut with means for indicating such place—as, for instance, by means of the rib, the depression, or the groove.

From the foregoing description it is apparent that the essential object of the present invention is to insure the upsetting of a bolt-thread at the best point for effectively interlocking the nut and the bolt, and it is obvious that the best point is where the thread comes out of the bolt-opening of the nut, as at this point it requires but a slight spreading or deflection of the thread to engage the adjacent outer surface of the nut and there is no danger of breaking the thread, because the latter when slightly offset or deflected laterally is arrested by contact with the face of the nut. Should the thread be upset at a point diametrically opposite from where it comes out of the bolt-opening of the nut, it would require several heavy blows to upset the thread sufficiently to engage the nut, as the thread is situated at a considerable distance from the nut, and in the majority of cases the upset portion would be entirely broken out of the thread, whereby there would be no locking connection between the bolt and the nut. Moreover, in an ordinary bolt and nut it is difficult to quickly determine where the thread of the bolt comes out of the bolt-opening of the nut, and therefore I provide the nut with conspicuous means for indicating where the thread-groove comes out, and said means also serves to indicate at what point to upset the bolt-thread, whereby this indicating means really has a double function. In the present specific manner of carrying out the invention by the employment of a socket or depression the latter also serves as a locking-seat for the reception of the upset portion of the bolt-thread, whereby the nut is locked against accidental turning in opposite directions.

From the foregoing description it will be apparent that the present invention provides an exceedingly simple and inexpensive nut-lock which may be readily applied to interlock the nut upon the bolt against accidental displacement and at the same time permits of the removal thereof, when desirable, by the application of force. Moreover, all movable or separate parts are dispensed with, so that there is no danger of loss of such parts, and the device is always in proper condition to be locked or unlocked.

It will be observed by reference to the drawings and understood from the foregoing description that the nut has an offset engaging surface formed by the inclined notch or recess in the face of the nut and that the said offset engaging surface is disposed at a lateral incline to the face of the nut, the said incline in the form of my invention here shown being formed by the end of the notch or recess 3, which notch or recess enables an exposed thread of the bolt to be upset and caused to bear against said laterally-inclined offset to lock the nut on the bolt and yet when the nut is forced, as by a wrench, to release it adapted to restore the upset thread of the bolt to its normal shape.

What I claim is—

1. The combination with a bolt, of a nut having a concaved depression in the face thereof adjacent to and opposite the point of emergence of the bolt-thread, the said depression having walls, which are inclined laterally to the face of the nut, the bolt-thread being depressed laterally into said depression, whereby the nut is locked to the bolt, and whereby on the application of power to turn said nut, said bolt-thread is restored to its normal position by the inclined walls of the said depression and the nut unlocked, substantially as described.

2. The combination of a bolt and a nut thereon, the latter having an offset engaging surface disposed at a lateral incline to its face but not displacing or affecting the thread thereof and opposite the thread of the bolt, said bolt-thread being offset laterally, in advance of said offset engaging surface, and engaging the same, substantially as described.

In testimony that I claim the foregoing as my own I have hereunto affixed my signature in the presence of two witnesses.

JAMES HENRY SWINDELL.

Witnesses:
T. W. EDWARDS,
R. ROSIQUE.